United States Patent [19]
Angebaud et al.

[11] Patent Number: 5,218,559
[45] Date of Patent: Jun. 8, 1993

[54] PSEUDO-RANDOM GENERATOR

[75] Inventors: Didier Angebaud, Chantepie; Jean Giachetti, Rennes; Vincent Lenoir, Le Rheu, all of France

[73] Assignees: France Telecom Etablissement Autonome de Droit Public (Centre National d'Etudes des Telecommunications), Issy Les Moulineaux; Etablissement Publics Telediffusion de France, Paris, both of France

[21] Appl. No.: 818,043

[22] Filed: Jan. 8, 1992

[30] Foreign Application Priority Data
Jan. 16, 1991 [FR] France .................. 91 00440

[51] Int. Cl.$^5$ .............................. G06F 7/58
[52] U.S. Cl. ........................ 364/717; 380/20
[58] Field of Search .................. 364/717; 380/20; 331/78

[56] References Cited

U.S. PATENT DOCUMENTS
4,543,559  9/1985  Guillou et al. .................... 364/717
4,649,419  3/1987  Arragon et al. .................... 380/20

FOREIGN PATENT DOCUMENTS
0014652  8/1980  European Pat. Off. .
0083998  7/1983  European Pat. Off. .
0115097  8/1984  European Pat. Off. .
2239817  2/1975  France .

Primary Examiner—David H. Malzahn
Attorney, Agent, or Firm—Oblon, Spivak, McClelland, Maier & Neustadt

[57] ABSTRACT

The generator of the invention includes an initialization circuit (CI) delivering four initialization words (QI, RI, SI, TI), one calculation circuit (CC) composed of four sub-units (SQ, SR, SS, ST) corresponding to four generating polynomials of orders 5, 5, 7 and 7, and finally one output logic circuit (CS) delivering a pseudo-random byte sequence.

Application for systems with access control, especially television systems.

6 Claims, 5 Drawing Sheets

PSEUDO-RANDOM GENERATOR

FIELD OF THE INVENTION

The present invention concerns a pseudo-random generator. It may be used whenever it is desired to scramble or descrable a series of bytes. It may also be particularly used in systems with access control used on subscribed television.

BACKGROUND OF THE INVENTION

The French patent application FR-A-2 448 824 describes a videography system in which the data is locked byte by byte with the aid of scrambling bytes delivered by a pseudo-random generator. This generator is made up of a set of trigger circuits and exclusive-OR gates. The performance of this type of generator is relatively mediocre when implanted in software. By way of indication, it needs about 6 seconds to descramble a televised page containing 1 kilo-byte.

The European patent EP-A-0 083 998 (corresponding to the American patent U.S. Pat. No. 4,543,559) describes a more high-performing and particularly faster pseudorandom generator without being more complex. Furthermore, the period of the pseudo-random sequence generated is increased up to about $2.3.10^{30}$ bytes. To this effect, the generator includes one initialization input and three sub-units each constituted by logic exclusive-OR gates, various registers and one adder. These sub-units define three recurrent sequences. A logic output circuit makes it possible to combine various bits appearing in these three sub-units. This logic circuit delivers 5 bits constituting the least significant 5 bits of one scrambling byte, the bits 6 and 7 being preset at 0 and the 8th being one parity bit calculated by an adder.

Although satisfactory in certain respects, this generator does have the drawback of only delivering 5 pseudo-random bits.

SUMMARY OF THE INVENTION

The object of the present invention is to provide a more high-performing generator in that it delivers 8 pseudo-random bits, that a complete byte.

Furthermore, the period of the pseudo-random sequence generated is further increased.

To this end, the generator of the invention includes four sub-units (instead of 3), these sub-units being respectively based on four irreducible polynomials Q, R, S and T with the form:

Q: $X^5 = 15X^2 + 30$ defined on the GALOIS field of order 31,

R: $X^7 = X + 15$ defined on the GALOIS field of order 31,

S: $(X^5 = 2X^2 + 125$ defined on the GALOIS field of order 127,

T: $X^7 = 2X + 125$ defined on the GALOIS field of order 127.

Each sub-unit delivers sequences with respective periodicities Tq, Tr, Ts and Tt equal to:

$Tq = (31^5 - 1)/15 = 2.5.11.17351$, $Tr = (31^7 - 1)/3 = 2.5.917087137$, $Ts = (127^5 - 1)/g = 2.7.262209281$, $Tt = (127^7 - 1)/9 = 2.7.43.86353.162789$.

The complete generator, which combines these four polynomials, generates bytes sequences with a periodicity equal to the least common multiple of Tq, Tr, Ts and Tt, this least common multiple having the value of $1,36.10^{\prime\prime}$.

More specifically, the invention concerns a pseudo-random generator of the type including:

an initialization circuit able to receive one initialization byte and deliver various initialization words constituted by various selections of bits forming the initialization byte, a calculation circuit formed of various sub-units each constituted by registers with parallel inputs/outputs, these inputs/outputs being interconnected through an adder and exclusive-OR logic gates, each sub-unit having one input receiving one of the initialization words and outputs delivering certain bits of certain registers of the sub-unit, a logic output circuit having inputs connected to the outputs of the various sub-units and including logic gates able to carry out logic operations on the bits originating from the various sub-units, this output circuit delivering a pseudo-random sequence of words, a clock delivering pulses controlling the various registers.

According to the invention, this generator is characterized in that:

A) the initialization circuit delivers 4 initialization words, the first with 5 bits, the second with 5 bits, the third with 7 bits and the fourth with 7 bits, B) the calculation circuit includes:

a first sub-unit including 5 registers of 5 bits, namely Q0, Q1, Q2, Q3, Q4, this first sub-unit receiving the first initialization word and corresponding to a generator polynomial equal to $X^5 = 15X^2 + 30$ on a GALOIS field of module 31, a second sub-unit including 7 registers of 5 bits, namely R0, R1, R2, R3, R4, R5, R6, this second sub-unit receiving the second initialization word and corresponding to a generator polynomial equal to $X^7 = X + 15$ on a GALOIS field of module 31, a third sub-unit including 5 registers of 7 bits, namely S0, S1, S2, S3, S4, this third sub-unit receiving the third initialization word and corresponding to a generator polynomial equal to $X^5 = 2X^2 + 125$ on a GALOIS field of module 127, a fourth sub-unit including 7 registers of 7 bits, namely T0, T1, T2, T3N, T4, T5, T6, this fourth sub-unit receiving the fourth initialization word and corresponding to a generator polynomial equal to $X^7 = 2X + 125$, the state Xn of the generator at a moment defined by a clock pulse n being defined by the contents of all the registers, namely respectively:

1st sub-unit: Q0, Q1, Q2, Q3, Q4
2nd sub-unit: R0, R1, R2, R3, R4, R5, R6
3rd sub-unit: S0, S1, S2, S3, S4
4th sub-unit: T1, T2, T3, T4, T5, T6, the means comprising these 4 sub-units being moreover interconnected in such as way that the state Xn+1 of the generator at the moment n+1 becomes:

1st sub-unit:
Q1, Q2, Q3⊕Q1, Q4, (16 Q2+Q0)mod 31,

2nd sub-unit:
R1, R2⊕RI, R3, R4, R5, R6 (R1+16 R0)mod 31,

3rd sub-unit:
S1, S2, S3⊕SI, S4 ((2 S2+2 S0)mod 127),

4th sub-unit:

T1, T2⊕TI, T3, T4, T5, T6 (2 T1+2 T0)mod 127,

C) the word delivered by the output logic circuit is one byte.

BRIEF DESCRIPTION OF THE DRAWINGS

The characteristics and advantages of the invention shall appear more readily from a reading of the following description relating to embodiment examples given by way of illustration and being non-restrictive and with reference to the accompanying drawings on which.

DETAILED DESCRIPTION OF THE PREFERRED EMBODIMENTS

Figure 1:
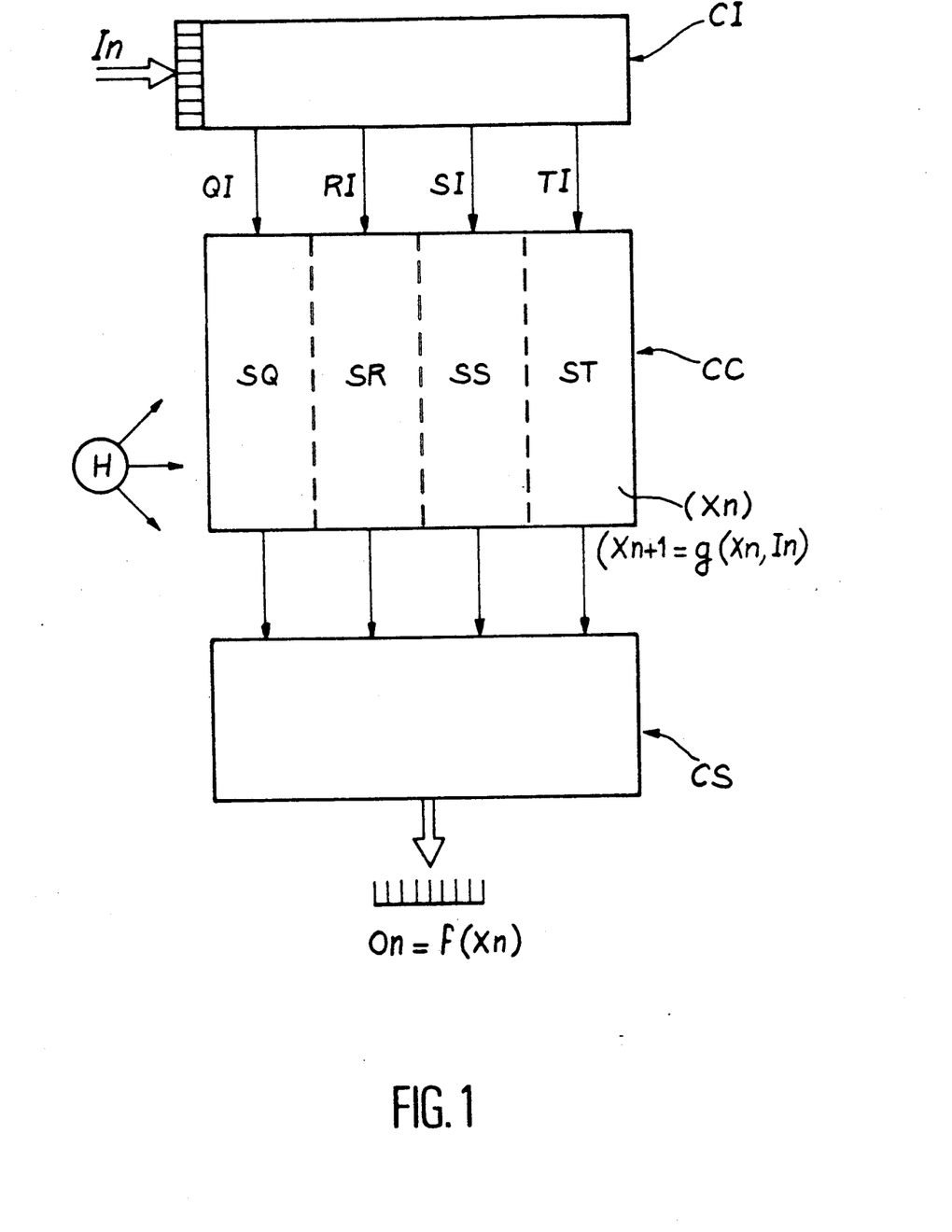
FIG. 1 shows the general structure of the generator of the invention.

FIG. 1 shows a generator including:

an initialization circuit CI receiving one initialization byte In and delivering four initialization words QI, RI, SI, TI, a calculation circuit CC composed of four sub-units SQ, SR, SS, ST respectively receiving the four initialization words QI, RI, SI, TI, a logic output circuit CS connected to said four sub-units and delivering one byte On, a clock H delivering pulses whose row is noted n.

At the moment n, the state of the generator is noted Xn. The output byte On is a function f of this state, namely:

$$On = f(Xn).$$

At the following moment n+1, the state Xn+1 of the generator is a function g of the preceding state Xn and of the initialization byte In, namely:

$$Xn+1 = g(Xn, In).$$

Figure 2:
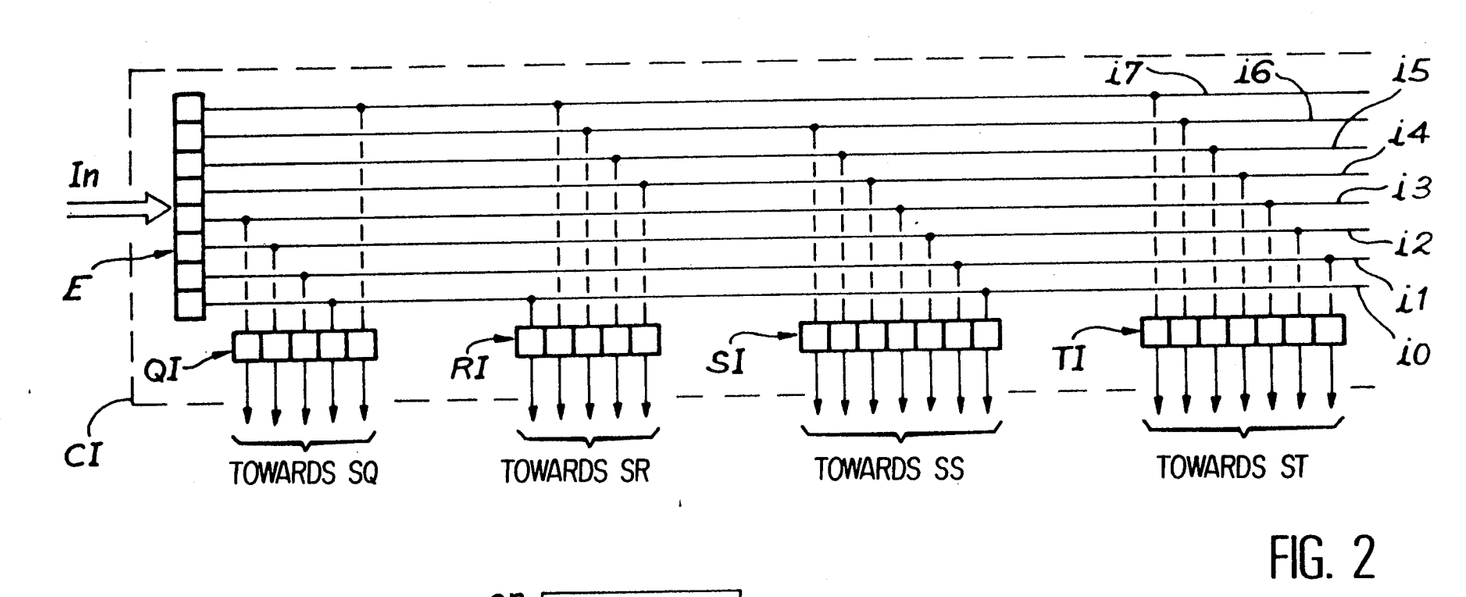
FIG. 2 shows the initialization circuit.
Figure 3A:
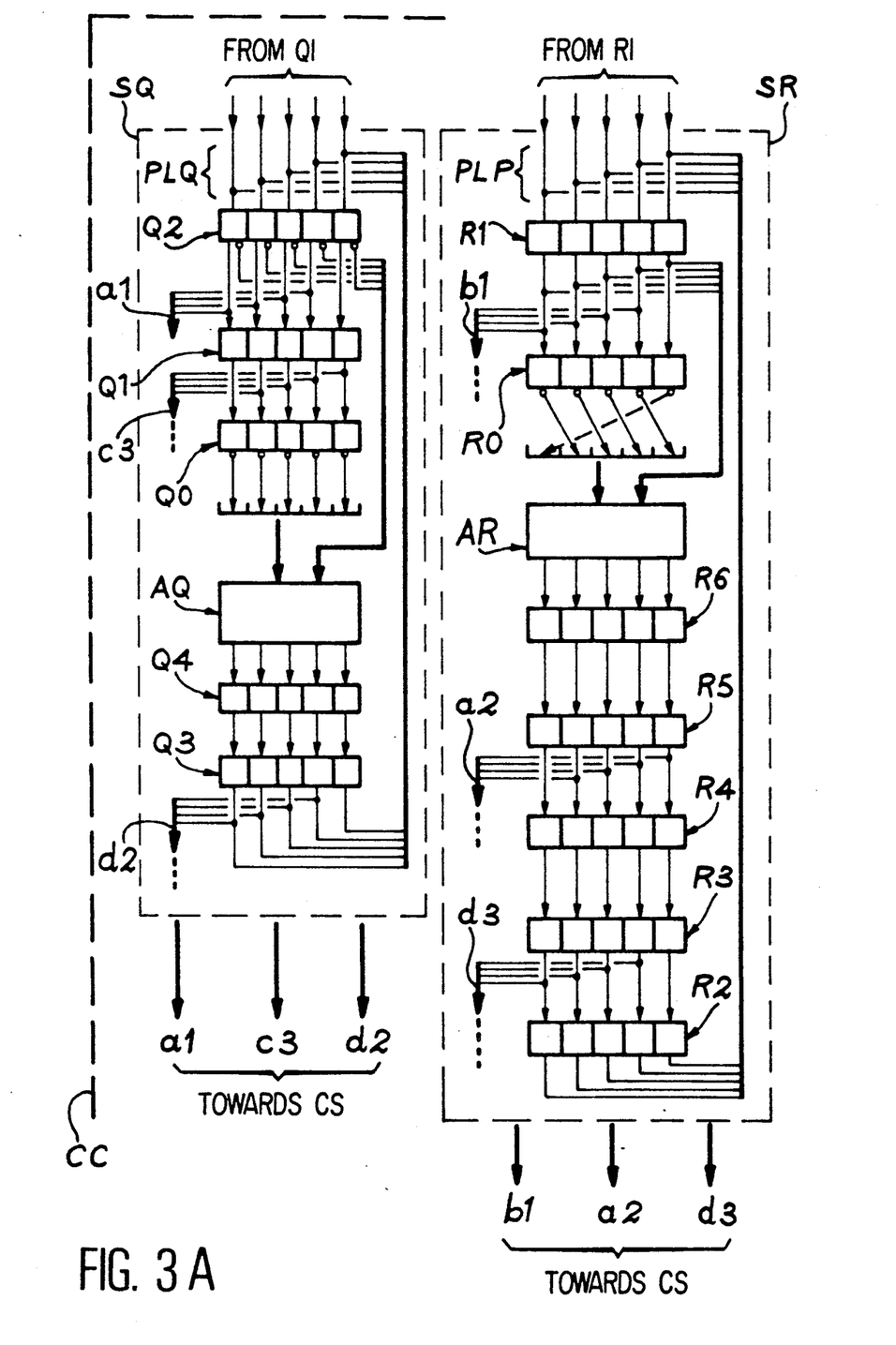
FIGS. 3A and 3B show the calculation circuit.
Figure 3B:
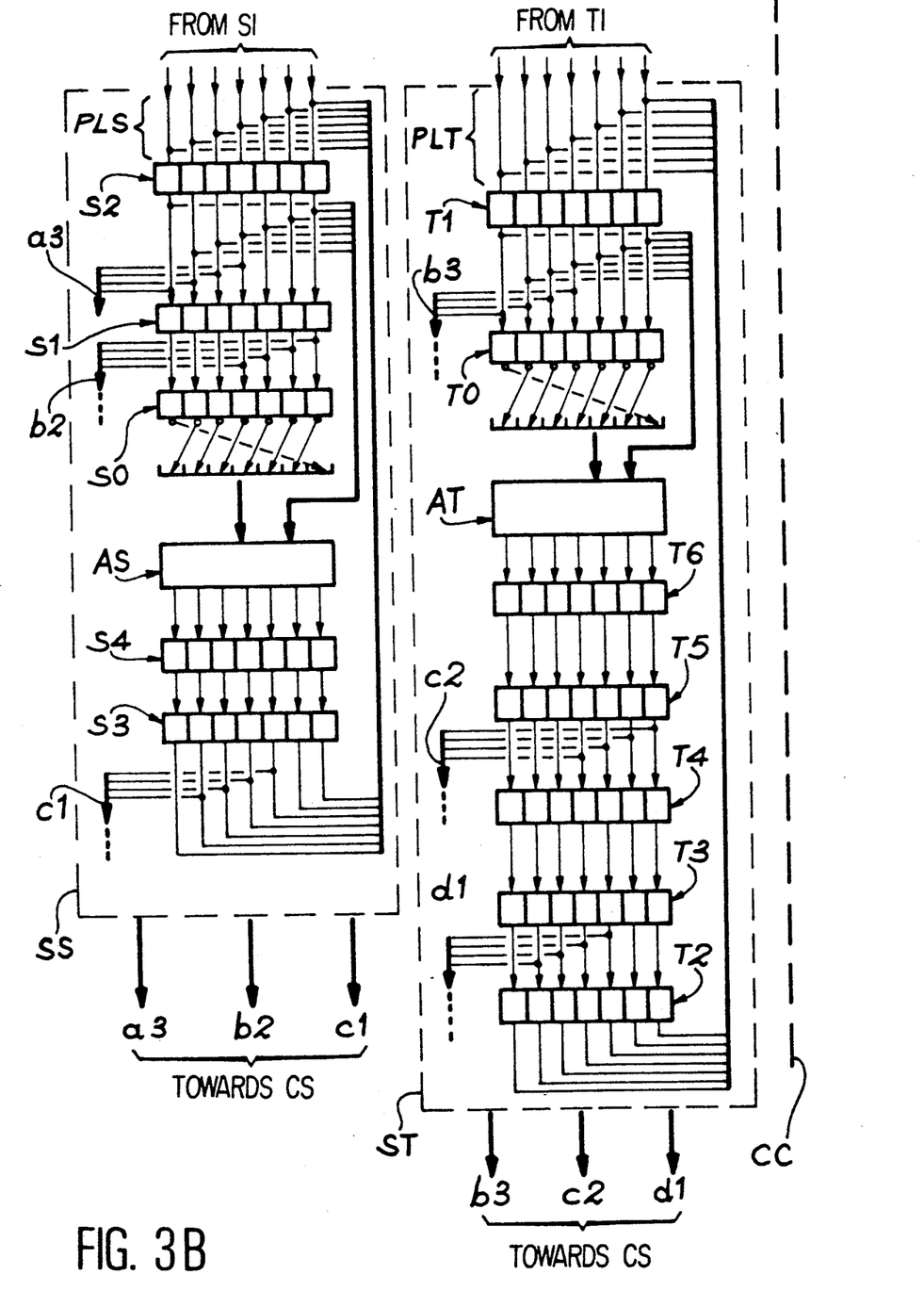
Figure 4:
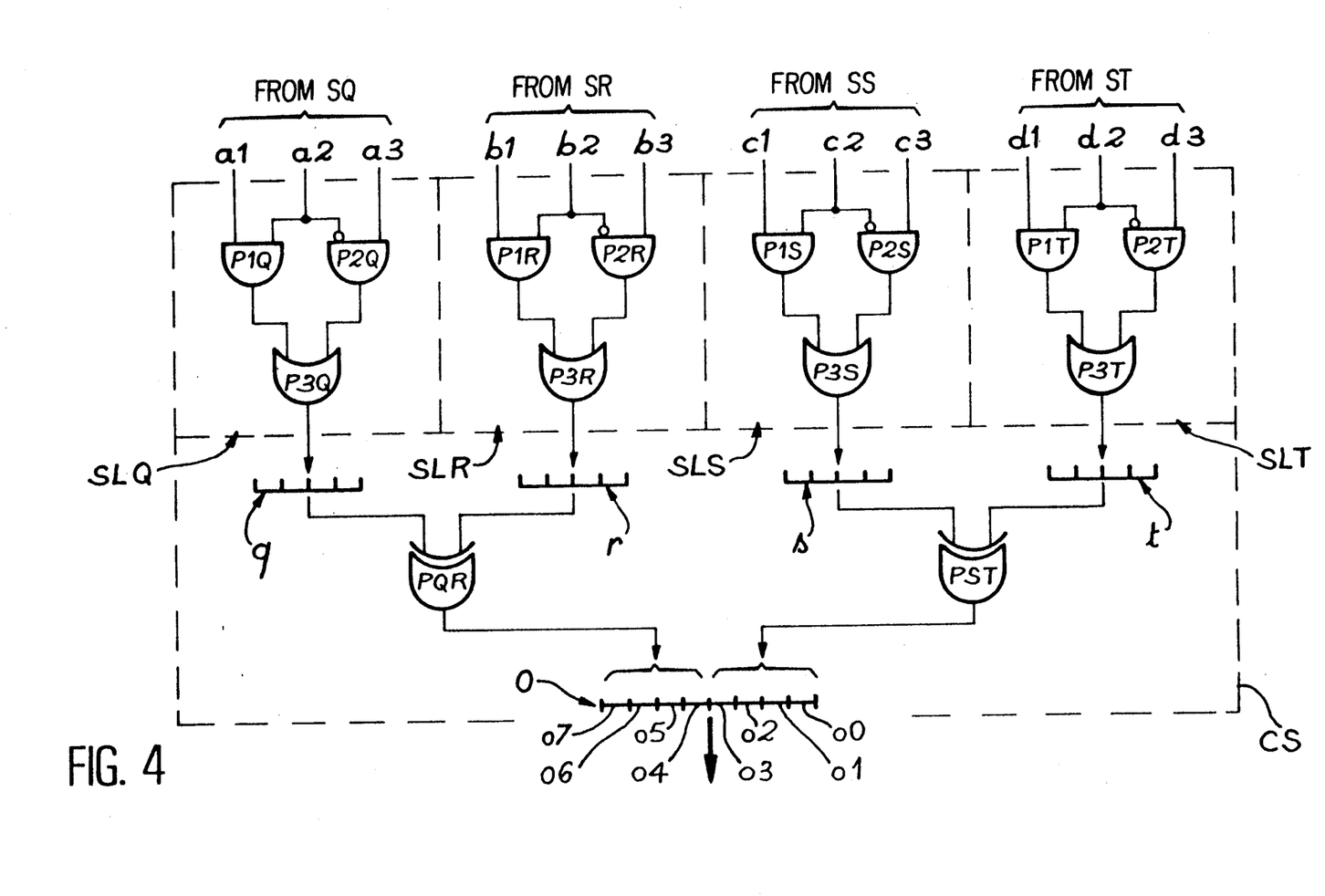
FIG. 4 shows the output logic circuit.

FIGS. 2, 3 and 4 show how it is possible to specify the structure of the initialization words applied to the four sub-units, as well as the functions f and g.

FIG. 2 firstly shows the initialization circuit CI. As shown, it includes an input register E with 8 cells receiving the initialization byte In. The various bits of this byte are noted by starting from the most significant bit: i6, i5, i4, i3, i2, i1, i0.

The byte In is formed according to the characteristics of the system in which the generator is inserted. The documents mentioned above describe the means for forming the initialization bytes The circuit CI shown includes:

a register QI with 5 cells respectively receiving the bits i3, i2, i1, i0, i7, a register RI with 5 cells respectively receiving the bits i0, i7, i6, i5, i4, a register SI with 7 cells respectively receiving the bits i6, i5, i4, i3, i2, i1, i0, a register TI with 7 cells respectively receiving the bits i7, i6, i5, i4, i3, i2, i1.

In practice, these registers QI, RI, SI, TI may be fictive since it merely suffices to carry out suitable connections to the output of the cells of the input register E so as to obtain selections of the desired bits. Nevertheless, it shall be subsequently assumed that these registers exist to facilitate the notations such as QI, RI, SI and TI which express initialization words forming part of the definition of the state of the system.

FIG. 3 shows the structure and connections of the various sub-units SQ, SR, SS and ST constituting the calculation circuit CC.

Apart from its 5 registers of 5 bits, namely Q0, Q1, Q2, Q3 and Q4, the first sub-unit includes a adder, modulo $31n$ AQ with 2 inputs and one output and a set of 5 PLQ exclusive-OR logic gates with two inputs and one output, these means being interconnected as follows:

the PLQ set of logic gates receives on one input the first initialization word QI, the register Q3 has its output connected to one input of the PLQ set of logic gates, the register Q2 is connected to the output of the PLQ set of gates, the register Q1 is connected to the register Q2, the register Q0 is connected to the register Q1, the adder AQ has one input connected to the register Q0 and the other input to the register Q2, the register Q4 has its input connected to the gate of the adder AQ, this first sub-unit having 3 outputs, the first a1 connected to the register Q2, the second c3 to the register Q1, and the third d2 to the register Q3.

Apart from its 7 registers of 5 bits R1, R2, R3, R4, R5 and R6, the second sub-unit SR includes an adder AR, modulo 31, with two inputs and one output, and a PLR set of exclusive-OR logic gates with two inputs and one output, these means being interconnected as follows:

the set of PLR logic gates receives on one of its inputs the second initialization word RI, the register R1 is connected to the output of the 5 PLR logic gates, the register R0 is connected to the register R1, the adder AR has one of its inputs connected to the outputs of the register R0 after the circular shift of one row towards the least significant bits and the other input connected to the register R1, the register R6 is connected to the output of the adder AR, the register R5 is connected to the register R6, the register R4 is connected to the register R5, the register R3 is connected to the register R4, the register R2 is connected to the register R3, the output of the register R2 being connected to the other input of the set of PLR logic gates, this second sub-unit having one first output b1 connected to the register R1, a second output a2 connected to the register R5 and a third output d3 connected to the register R3.

Apart from its 5 registers of 7 bits S0, S1, S2, S3, S4, the third sub-unit SS includes an adder AS, modulo 127, with two inputs and one output, and a set of 7 PLS exclusive-OR logic gates with 2 inputs and one output, these means being interconnected as follows:

the set of PLS logic gates receives on one of its inputs the third initialization word SI, the register S2 is connected to the output of the set of PLS logic gates, the register S1 is connected to the register S2, the register S0 is connected to the register S1, the register S4 is connected to the output of the adder AS, the register S3 has its input connected to S4 and its output connected to the other input of the set of PLS gates, the adder AS has one of its inputs connected to the outputs of the register S0 after a circular shift of two rows towards the most significant bits and the other to the register S2, this third sub-unit SS having one first output a3 connected to the register S2, one second output b2 connected to the register S1, and one third output c1 connected to the register S3.

Apart from its 7 registers of 7 bits T0, T1, T2, T3, T4, T5 and T6, the fourth sub-unit ST includes an adder AT, modulo 127, with two inputs and one output and a set of PLT exclusive-OR logic gates with 2 inputs and one output, these means being interconnected as follows:

the set of PLT logic gates receives on one of its inputs the fourth initialization word TI, the register T0 is connected to the register T1, the adder AT has one of its inputs connected to the outputs of the register T0 after the circular shift of one row towards the most significant bits and the other input connected to the register T1, the register T6 is connected to the output of the adder AT, the register T5 is connected to the register T6,
the register T4 is connected to the register T5,
the register T3 is connected to the register T4,
the register T2 is connected to the register T3,
the register T2 is connected to the register T3, this fourth sub-unit S' having one first output b3 connected to the output of the register T1, one second output c2 connected to the register T5, and one third output d1 connected to the register T3.

FIG. 4 shows the structure of the output logic circuit CS.

As shown, this circuit includes:

one first SLQ logic sub-unit having 3 inputs connected to the 3 outputs a1, a2 and a3 of the sub-units SQ, SR, SS of the calculation circuit CC and including two AND gates P1Q, P2Q respectively receiving a1 and a2 and a2 and a3 and one OR gate PQ3 having two inputs connected to the two AND gates and one output delivering one first word of 4 bits q, one second SLR logic sub-unit identical to the first SLQ P1R, P2R, P3R and connected to the outputs b1, b2 and b3 of the sub-units SR, SS, ST of the calculation circuit and delivering a second word of 4 bits r, one third SLS logic sub-unit identical to the first sub-unit SLQ P1S, P2S, P3S and connected to the outputs c1, c2 and c3 of the sub-units SQ, SS and ST of the calculation circuit and delivering a third word of 4 bits s, one fourth SLT logic sub-unit identical to the first sub-unit SLQ P1T, P2T, P3T and connected to the outputs d1, d2 and d3 of the sub-units SQ, SR and ST of the calculation circuit CC and delivering a fourth word of 4 bits t, one first PQR exclusive-OR logic gate receiving the two words q and r and delivering one word of 4 bits constituting the most significant 4 bits $O(7)$, $O(6)$, $O(5)$, $O(4)$ of the byte On finally delivered by the generator, one second PST exclusive-OR logic gate receiving the 2 words s and t and delivering one word of 4 bits constituting the least significant 4 bits $O(3)$, $O(2)$, $O(1)$, $O(0)$ of the byte On finally delivered by the generator.

Having regard to the value of the bits applied to the input of the circuit, one is easily able to ensure that the 8 output bits, namely $O(7)$, $O(6)$, $O(5)$, $O(4)$, $O(3)$, $O(2)$, $O(1)$, $O(0)$ are given by the following logic relations:

$$o(0) = [S3(2).T5(0) + Q1(0).T5(0)] \oplus [\overline{T3(2).Q3(1) + R3(1).Q3(1)}]$$

$$o(1) = [S3(3).T5(1) + Q1(1).T5(1)] \oplus [\overline{T3(3).Q3(2) + R3(2).Q3(2)}]$$

$$o(2) = [S3(4).T5(2) + Q1(2).T5(2)] \oplus [\overline{T3(4).Q3(3) + R3(3).Q3(3)}]$$

$$o(3) = [S3(5).T5(3) + Q1(3).T5(3)] \oplus [\overline{T3(5).Q3(4) + R3(4).Q3(4)}]$$

$$o(4) = [Q2(1).R5(0) + S2(3).R5(0)] \oplus [\overline{R1(1).S1(0) + T1(3).S1(0)}]$$

$$o(5) = [Q2(2).R5(1) + S2(4).R5(1)] \oplus [\overline{R1(2).S1(1) + T1(4).S1(1)}]$$

$$o(6) = [Q2(3).R5(2) + S2(5).R5(2)] \oplus [\overline{R1(3).S1(2) + T1(5).S1(2)}]$$

$$o(7) = [Q2(4).R5(3) + S2(6).R5(3)] \oplus [\overline{R1(4).S1(3) + T1(6).S1(3)}].$$

In these equations, and according to usual conventions, the sign $\oplus$ represents the exclusive-OR operation, the sing + the OR operation, the point the AND operation and the horizontal bar the logic complement.

Figure 5:
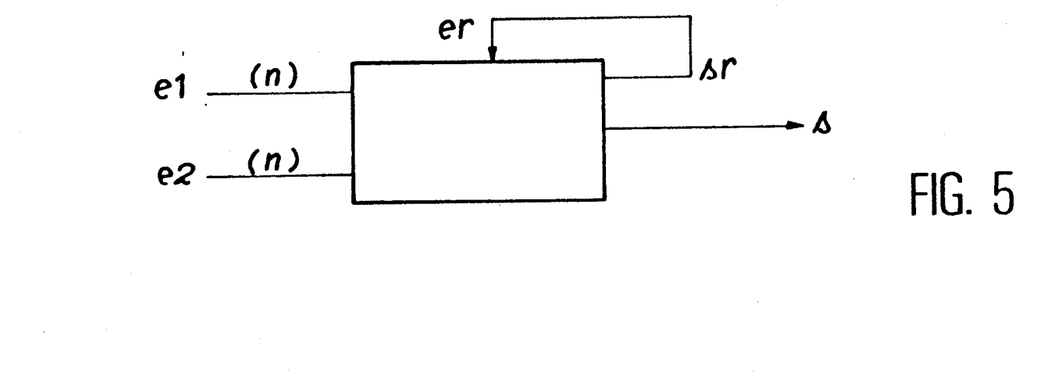
FIG. 5 shows one embodiment of an adder, modulo $2^n-1$.

In the embodiment shown on FIG. 3, the sub-units SQ, SR, SS and ST contain adders, respectively modulo 31 and 127, that is generally speaking the modulo $2^n - 1$ with n equal to 5 or 7. An adder modulo $2^n - 1$ may be obtained in accordance with the invention and FIG. 5 by means of an adder with n bits whose carry output sr is relooped onto the carry input er. The two inputs e1, e2 receive words of n bits (that is with 5 or 7 bits) and the output s delivers the modulo sum $2^n - 1$.

What is claimed is:

1. Pseudo-random generator including:

one initialization circuit able to receive one initialization byte and deliver various initialization words constituted by various selections of bits forming the initialization byte, one calculation circuit formed of various sub-units each constituted by registers with parallel inputs/outputs, these inputs/outputs being interconnected through an adder and exclusive-OR logic gates, each sub-unit having one input receiving one of the initialization words and outputs delivering certain bits from certain registers of the sub-unit, one logic output circuit having inputs connected to the outputs of the various sub-units and including logic gates able to carry out logic operations on the bits originating from the various sub-units, this output circuit delivering a pseudo-random sequence of words, a clock delivering pulses controlling the various registers, this generator being characterized by the fact that:

A) the initialization circuit delivers 4 initialization words, the first with 5 bits, the second with 5 bits, the third with 7 bits and the fourth with 7 bits, B) the calculation circuit includes:

one first sub-unit including 5 registers of 5 bits, Q0, Q1, Q2, Q3, Q4, this first sub-unit receiving the first initialization word and corresponding to a generator polynomial equal to $X^5 = 15X^2 + 30$ on a GALOIS field of module 31, a second sub-unit including 7 registers of 5 bits, namely R0, R1, R2, R3, R4, R5, R6, this second sub-unit receiving the second initialization word and corresponding to a generator polynomial equal to $X^7 = X + 15$ on a GALOIS field of module 31, one third sub-unit including 5 registers of 7 bits, namely S0, S1, S2, S3, S4, this third sub-unit receiving the third initialization word and corresponding to a generator polynomial equal to $X^5 = 2X^2 + 125$ on a GALOIS field of module 127, one fourth sub-unit including 7 registers of 7 bits, namely T0, T1, T2, T3, T4, T5, T6, this fourth sub-unit receiving the fourth initialization word and corresponding to a generator polynomial equal to $X^7 = 2X + 125$, the state Xn of the generator at an instant defined by a clock pulse n being defined by the contents of all the registers, namely respectively:

1st sub-unit: Q0, Q1, Q2, Q3, Q4
2nd sub-unit: R0, R1, R2, R3, R4, R5, R6
3rd sub-unit: S0, S1, S2, S3, S4
4th sub-unit: T0, T1, T2, T3, T4, T5, T6, the means comprising these 4 sub-units being moreover interconnected so that the state Xn+1 of the generator at the instant n+1 becomes:

1st sub-unit:
Q1, Q2, Q3⊕Q1, Q4, (16 Q2+Q0)mod 31,
2nd sub-unit:
R1 R2⊕RI, R3, R4, R5, R6 (R1+16 R0)mod 31,
3rd sub-unit:
S1, S2, S3⊕SI, S4 ((2 S2+2 S0)mod 127),
4th sub-unit:
T1, T2⊕TI, T3, T4, T5, T6 (2 T1+2 T0)mod 127, C) the word delivered by the output logic circuit is one byte.

2. Generator according to claim 1, wherein the initialization circuit receiving one initialization byte whose 8 bits are noted i7, i5, i4, i3, i2, i1, i0:

the first initialization word includes the 5 bits i3, i2, i1, i0, i7, the second initialization word includes the 5 bits i3, i2, i1, i0, i7, the third initialization word includes the 7 bits i6, i5, i4, i3, i2, i1, i0, the fourth initialization word includes the 7 bits i7, i6, i5, i4, i3, i2, i1.

3. Generator according to claim 2, wherein:

a) the first sub-unit of the calculation circuit includes, apart from its registers of 5 bits, an adder, modulo 31 with 2 inputs and one output and a set of 5 exclusive-OR logic gates with two inputs and one output, these means being interconnected as follows:

the set of logic gates receives on one input the first initialization word, the register (Q3) has its input connected to the register (Q4) and its output connected to the other input of the set of logic gates, the register (Q2) is connected to the set of logic gates,
the register (Q1) is connected to the register (Q2),
the register (Q0) is connected to the register (Q1),
the adder has one input connected to the register (Q0) and the other input to the register (Q2),
the register (Q4) has its input connected to the gate of the adder (AQ), this first sub-unit having 3 outputs, the first connected to the register (Q2), the second to the register (Q1), the third to the register (Q3), b) the second sub-unit of the calculation circuit includes, apart from its 7 registers of 5 bits, an adder, modulo 31, with two inputs and one output, and a set of exclusive-OR logic gates with two inputs and one output, these means being interconnected as follows:

the set of logic gates receives on one of its inputs the second initialization word, the register (R1) is connected to the output of the 5 logic gates,
the register (R0) is connected to the register (R1),
the adder has one of its inputs connected to the outputs of the register (R0) after the circular shift of one row towards the least significant bits and the other input connected to the register (R1),
the register (R6) is connected to the output of the adder,
the register (R5) is connected to the register (R6),
the register (R4) is connected to the register (R5),
the register (R3) is connected to the register (R4),
the register (R2) is connected to the register (R3), the output of the register (R2) being connected to the other input of the set of logic gates, this second sub-unit having one first output connected to the register (R1), one second output connected to the register (R6) and one third output connected to the register (R4), c) the third sub-unit of the calculation circuit includes, apart from its 5 registers of 7 bits, an adder, modulo 127, with two inputs and one output and a set of 7 exclusive-OR logic gates with 2 inputs and one output, these means being interconnected as follows:

the set of logic gates receives on one of its inputs the third initialization word, the register (S2) is connected to the output of the set of logic gates,
the register (S3) has its input connected to the register (S4) and its output to the other input of the set of logic gates,
the register (S1) is connected to the register (S2),
the register (S0) is connected to the register (S1),
the adder (AS) has one of its inputs connected to the outputs of the register (S0) after the circular shift of two rows towards the least significant bits and the other to the register (S2),
this third sub-unit having one first output connected to the register (S2), one second output connected to the register (S1) and a third output to the register (S3), d) the fourth sub-unit of the calculation circuit includes, apart from its 7 registers of 7 bits, an adder, modulo 127, with two inputs and one output and a set of exclusive-OR logic gates with 2 inputs and one output, these means being interconnected as follows:

the set of logic gates receives on one of its inputs the fourth initialization word, the register (T1) is connected to the output of the set of logic gates,
the register (T0) is connected to the register (T1),
the adder (AT) has one of its inputs connected to the outputs of the register (T0) after the circular shift of one row towards the most significant bits and the other input connected to the register (T1),
the register (T6) is connected to the output of the adder (AT),
the register (T5) is connected to the register (T6),
the register (T4) is connected to the register (T5),
the register (T3) is connected to the register (T4),
the register (T2) has its input connected to the register (T3) and its output to the other input of the set of logic gates, this fourth sub-unit having one first output connected to the output of the register (T1), one second output connected to the register (T6) and one third output connected to the register (T3).

4. Generator according to claim 3, wherein the adders, modulo 31, (respectively the adders modulo 127 (AS, AT)) are each constituted by an adder with 5 bits (respectively 7 bits) with one carry output and one carry input, said output being relooped on said input.

5. Generator according to claim 1, wherein the byte delivered by the output logic circuit is noted O(7), O(6), O(5), O(4), O(3), O(2), O(1), O(0), this logic circuit being provided with means able to form these bits via the following logical combinations where the figure in brackets indicates the row of the bit taken from the corresponding register:

$$o(0) = [S3(2).T5(0) + Q1(0).T5(0)] \oplus [T3(2).Q3(1) + R3(1).Q3(1)]$$

$$o(1) = [S3(3).T5(1) + Q1(1).T5(1)] \oplus [T3(3).Q3(2) + R3(2).Q3(2)]$$

$$o(2) = [S3(4).T5(2) + Q1(2).T5(2)] \oplus [T3(4).Q3(3) + R3(3).Q3(3)]$$

$$o(3) = [S3(5).T5(3) + Q1(3).T5(3)] \oplus [T3(5).Q3(4) + R3(4).Q3(4)]$$

$$o(4) = [Q2(1).R5(0) + S2(3).R5(0)] \oplus [R1(1).S1(0) + T1(3).S1(0)]$$

$$o(5) = [Q2(2).R5(1) + S2(4).R5(1)] \oplus [R1(2).S1(1) + T1(4).S1(1)]$$

$$o(6) = [Q2(3).R5(2) + S2(5).R5(2)] \oplus [R1(3).S1(2) + T1(5).S1(2)]$$

$$o(7) = [Q2(4).R5(3) + S2(6).R5(3)] \oplus [R1(4).S1(3) + T1(6).S1(3)].$$

6. Generator according to claim 5, wherein the output circuit includes:

one first logic sub-unit having 3 inputs connected to the 3 outputs of the sub-units of the calculation circuit and including two AND gates respectively receiving (a1 and a2) and (a2 and a3) and one OR gate having two inputs connected to the two AND gates and one output delivering a first word of 4 bits, one second logic sub-unit identical to the first one and connected to the outputs of the sub-units of the calculation circuit and delivering one second word of 4 bits, one third logic sub-unit identical to the first one and connected to the outputs of the sub-units of the calculation circuit and delivering a third word of 4 bits, one fourth logic sub-unit identical to the first one and connected to the outputs of the sub-units of the calculation circuit and delivering one fourth word of 4 one first exclusive-OR logic gate receiving the two words (q and r) and delivering a word of 4 bits constituting the most significant 4 bits of the byte On finally delivered by the generator, one second exclusive-OR logic gate receiving the two words (s and t) and delivering a word of 4 bits constituting the least significant 4 bits of the byte On finally delivered by the generator.

* * * * *

UNITED STATES PATENT AND TRADEMARK OFFICE
CERTIFICATE OF CORRECTION

PATENT NO. :   5,218,559
DATED       :   June 8, 1993
INVENTOR(S) :  Didier Angebaud et al.

It is certified that error appears in the above-indentified patent and that said Letters Patent is hereby corrected as shown below:

On the title page, Item [73] and [75],

The second assignee's name is incorrect, should read:

--Telediffusion de France--

The second inventor's first name is incorrect, should read:

--Jean-Luc--

Signed and Sealed this

Eleventh Day of January, 1994

Attest:

BRUCE LEHMAN

Attesting Officer     *Commissioner of Patents and Trademarks*